(12) United States Patent
Wagner et al.

(10) Patent No.: US 6,229,857 B1
(45) Date of Patent: May 8, 2001

(54) ADAPTIVE INGRESS FILTERING SYSTEM

(75) Inventors: Andy Wagner, Sunnyvale; James D. McVey, Palo Alto, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/089,001

(22) Filed: Jun. 2, 1998

(51) Int. Cl.[7] .................................................. H04L 27/14
(52) U.S. Cl. ............................................................ 375/316
(58) Field of Search .................................. 375/316, 347, 375/348, 349, 331; 455/133, 134, 226.1, 226.2

(56) References Cited

U.S. PATENT DOCUMENTS

| | | | |
|---|---|---|---|
| 5,185,610 | * | 2/1993 | Ward et al. ............................ 342/357 |
| 5,345,468 | * | 9/1994 | Bi ............................................. 375/1 |
| 5,469,465 | * | 11/1995 | Birchler et al. ...................... 375/346 |
| 5,638,362 | * | 6/1997 | Dohi et al. ............................ 370/342 |
| 5,659,584 | * | 8/1997 | Uesugi et al. ........................ 375/347 |
| 5,663,733 | * | 9/1997 | Lennen .................................. 342/357 |
| 5,671,221 | * | 9/1997 | Yang ..................................... 370/320 |
| 5,689,526 | * | 11/1997 | Slonneger et al. ................... 375/206 |
| 5,868,173 | * | 1/1999 | Dent ..................................... 375/206 |
| 5,910,948 | * | 6/1999 | Shou et al. ............................ 370/335 |
| 5,956,328 | * | 9/1999 | Sato ...................................... 370/335 |
| 5,956,333 | * | 9/1999 | Zhou et al. ............................ 370/342 |
| 5,963,582 | * | 10/1999 | Stansell, Jr. .......................... 375/200 |
| 6,009,118 | * | 12/1999 | Tiemann et al. ..................... 375/208 |
| 6,018,547 | * | 1/2000 | Arkhipkin et al. .................. 375/208 |
| 6,032,026 | * | 2/2000 | Seki et al. .............................. 455/63 |
| 6,088,383 | * | 7/2000 | Suzuki et al. ......................... 375/148 |

* cited by examiner

Primary Examiner—Chi Pham
Assistant Examiner—Bayard Emmanuel
(74) Attorney, Agent, or Firm—Blakely, Sokoloff, Taylor & Zafman LLP

(57) ABSTRACT

A method and apparatus for filtering an undesired ingress signal from an input signal. The apparatus includes an adaptive filter including an ingress synthesizer for recreating the undesired ingress signal and an ingress subtractor for subtracting the recreated ingress signal from the input signal. The ingress synthesizer includes a replica generator for generating replicas corresponding respectively to the input signal symbols, first summers for subtracting the replicas from the input signal for providing respective intermediate signals, second summers for subtracting a recreated ingress signal from the intermediate signals for providing respective error signals, a decision circuit for selecting the intermediate signal corresponding to the error signal having the smallest magnitude, and an ingress generator for processing the selected intermediate signal for providing the recreated ingress signal to the second summers and the ingress subtractor. The ingress generator converts the selected intermediate signal to component signals indicative of the magnitude, phase, and frequency of the intermediate signal, individually filters the component signals, and uses the filtered component signals for synthesizing the recreated ingress signal. The ingress subtractor subtracts the recreated ingress signal from the input signal for providing a filtered input signal where the undesired ingress signal has a reduced level as compared to the original input signal.

18 Claims, 4 Drawing Sheets

ADAPTIVE INGRESS FILTERING SYSTEM

BACKGROUND OF THE INVENTION

1. Field of the Invention

The invention relates generally to a system for reducing ingress and more particularly to a method and apparatus for filtering an input signal for reducing the level of an undesired ingress signal.

2. Description of the Prior Art

Signal ingress is a common problem that degrades performance in systems that use signals for communicating information. One solution to this problem is to move the carrier frequency of the desired signal away from the frequency of the ingress signal. However, this is usually not possible due to the constraints or the regulations on the system. Another solution is to filter the ingress signal with an analog notch filter in the front end or an intermediate frequency (IF) section of the receiver in the system. However, the frequency of the ingress signal is typically not known before hand so the notch filter must be capable of being tuned if it is to be effective. Unfortunately, such tuned analog notch filters tend to be complex and difficult to integrate into the digital integrated circuits used in a receiver and therefore add to the expense of a system. Another solution is to use an equalizer of the type commonly used for multipath suppression for digitally notch filtering the ingress signal. However, unless the equalizer is very large, and therefore expensive, an ingress signal may use up the equalizer's entire dynamic range, or the equalizer may filter a notch band that is too wide to allow enough of the desired signal to pass. Another solution is to spread the spectrum of the desired signal when it is transmitted and then de-spread the signal when it is received. The spreading may be done either by frequency hopping or phase sequence modulation. However, the circuitry for such spread spectrum systems is much more complicated and correspondingly more expensive than the circuitry for systems that do not use spread spectrum. There is a need for an ingress filter that is simple, inexpensive, and easy to integrate into the digital integrated circuits that are used in a receiver.

FIG. 1 is a diagram in the complex IQ plane showing an exemplary quadrature phase shift key (QPSK) signal where correct modulation symbols states are shown at locations 1, 2, 3, and 4. The correct symbol states 1, 2, 3, and 4 are modulated by an undesired ingress signal as shown as patterns 5, 6, 7, and 8, respectively. An I axis and a Q axis divide the IQ plane horizontally and vertically, respectively, into quadrants. When the QPSK signal is detected anywhere in the upper right quadrant the signal is demodulated as the symbol corresponding to the location 1, when the input signal is detected anywhere in the upper left quadrant the signal is demodulated as the symbol corresponding to the location 2, when the input signal is detected anywhere in the lower left quadrant the signal is demodulated as the symbol corresponding to the location 3, and when the input signal is detected anywhere in the lower right quadrant the signal is demodulated as the symbol corresponding to the location 4. However, the undesired ingress signal causes undesired ingress modulation causing the actual received modulation symbol state locations in the patterns 5–8 to occur within a roughly circular range about the locations 1–4, respectively. The patterns 5–8 are broadened by a spiraling effect of amplitude modulation of the ingress signal and by noise. As shown in the diagram the undesired modulations 5–8 will cause the signal to be detected in a different quadrant than the associated respective locations 1–4 and will therefore result in incorrect determinations of the modulation symbol states.

SUMMARY OF THE INVENTION

It is therefore an object of the present invention to provide a method and apparatus that is simple, inexpensive, and suitable for integration in a digital integrated circuit for filtering an undesired ingress signal from an input signal in order to increase the likelihood that the correct modulation symbol states are determined.

Briefly, in a preferred embodiment, the present invention includes an adaptive ingress filter for receiving an input signal having at least two possible input signal symbols having undesired ingress modulation due to an undesired ingress signal. The ingress filter includes an ingress synthesizer for separating and recreating an ingress signal and an ingress subtractor for subtracting the recreated ingress signal from the input signal for providing a filtered input signal where the level of the undesired modulation caused by the ingress signal has been substantially reduced. The ingress synthesizer includes a replica generator for generating replicas corresponding respectively to the correct input signal symbols, a first summer for subtracting the replicas from the input signal for providing respective intermediate signals, a second summer for subtracting a recreated ingress signal from the intermediate signals for providing respective error signals, a decision circuit for selecting the intermediate signal corresponding to the error signal having the smallest magnitude, and an ingress generator for processing the selected intermediate signal for providing the recreated ingress signal to the second summer and the ingress subtractor. The ingress generator processes the selected intermediate signal by converting the signal to component signals indicative of the magnitude, phase, and frequency of the selected intermediate signal, individually filtering the component signals, and using the filtered component signals for synthesizing the recreated ingress signal. Optionally, the index of the particular replica that corresponds to the selected intermediate signal may be used for identifying the correct symbols without further processing. However, in a preferred embodiment the ingress subtractor subtracts the recreated ingress signal from the input signal for providing the filtered input signal. The filtered input signal is then used for determining the correct input signal symbols.

A receiver of the present invention includes a first demodulator subsection for carrier synchronization and frequency spectrum filtering, a sequence detector/generator for recognizing known sequences in the input signal and providing information for the sequences to the ingress filter, an interburst ingress estimator for using the input signal during an interburst gap for providing an initial ingress estimate signal for aligning the ingress synthesizer to the ingress signal at the start of a signal burst, the ingress filter for filtering an undesired ingress signal from the input signal, a second demodulator subsection for equalizing the filtered input signal and determining the correct input signal symbols, and a processor for deriving communication information from the signal symbols.

An advantage of the present invention for filtering an undesired ingress signal from an input signal is that it is simple, inexpensive, and suitable for integration in a digital integrated circuit.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
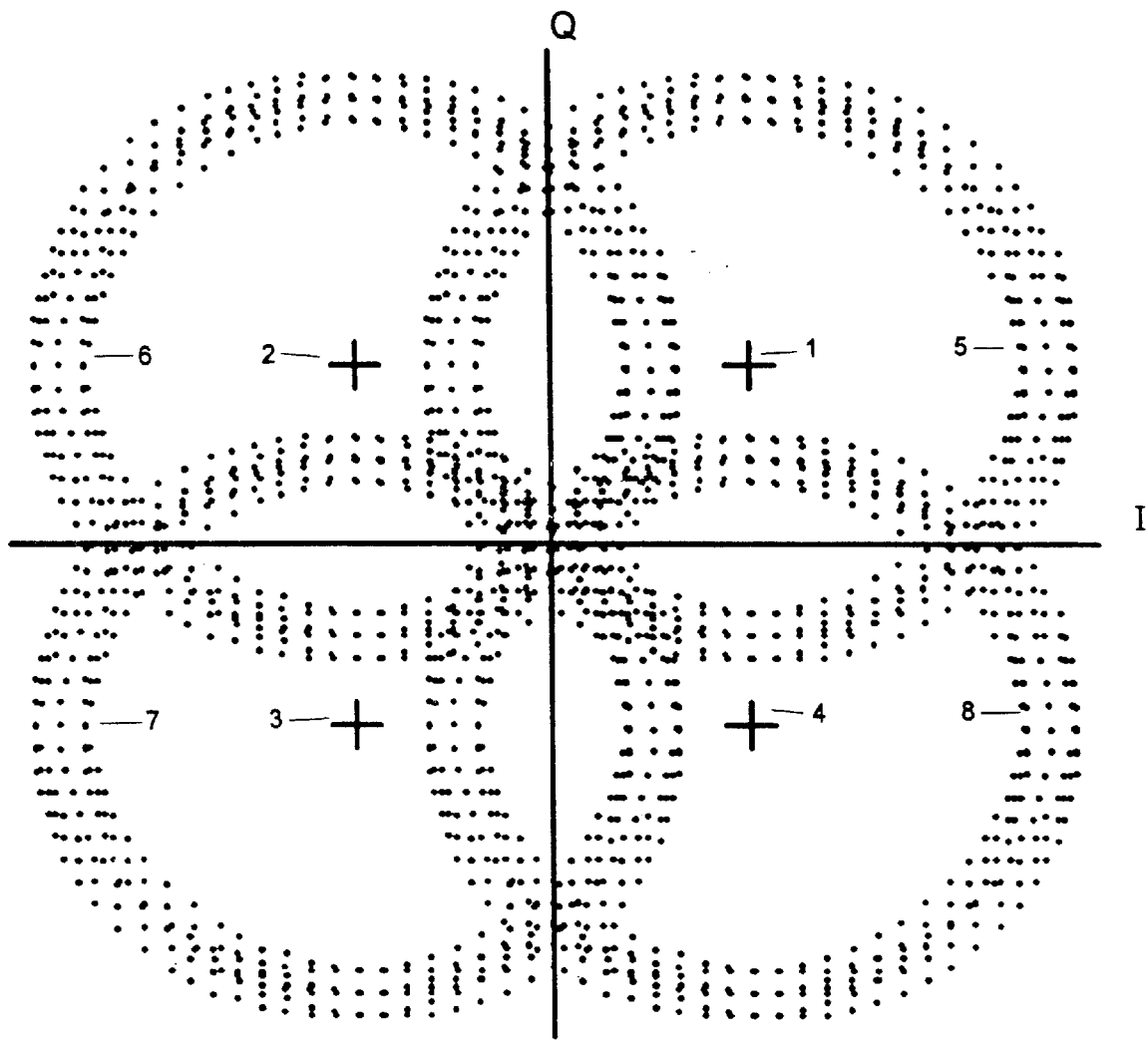
FIG. 1 is an IQ diagram of an exemplary input signal where the correct modulation symbol states are modulated by an undesired ingress signal.
Figure 2:
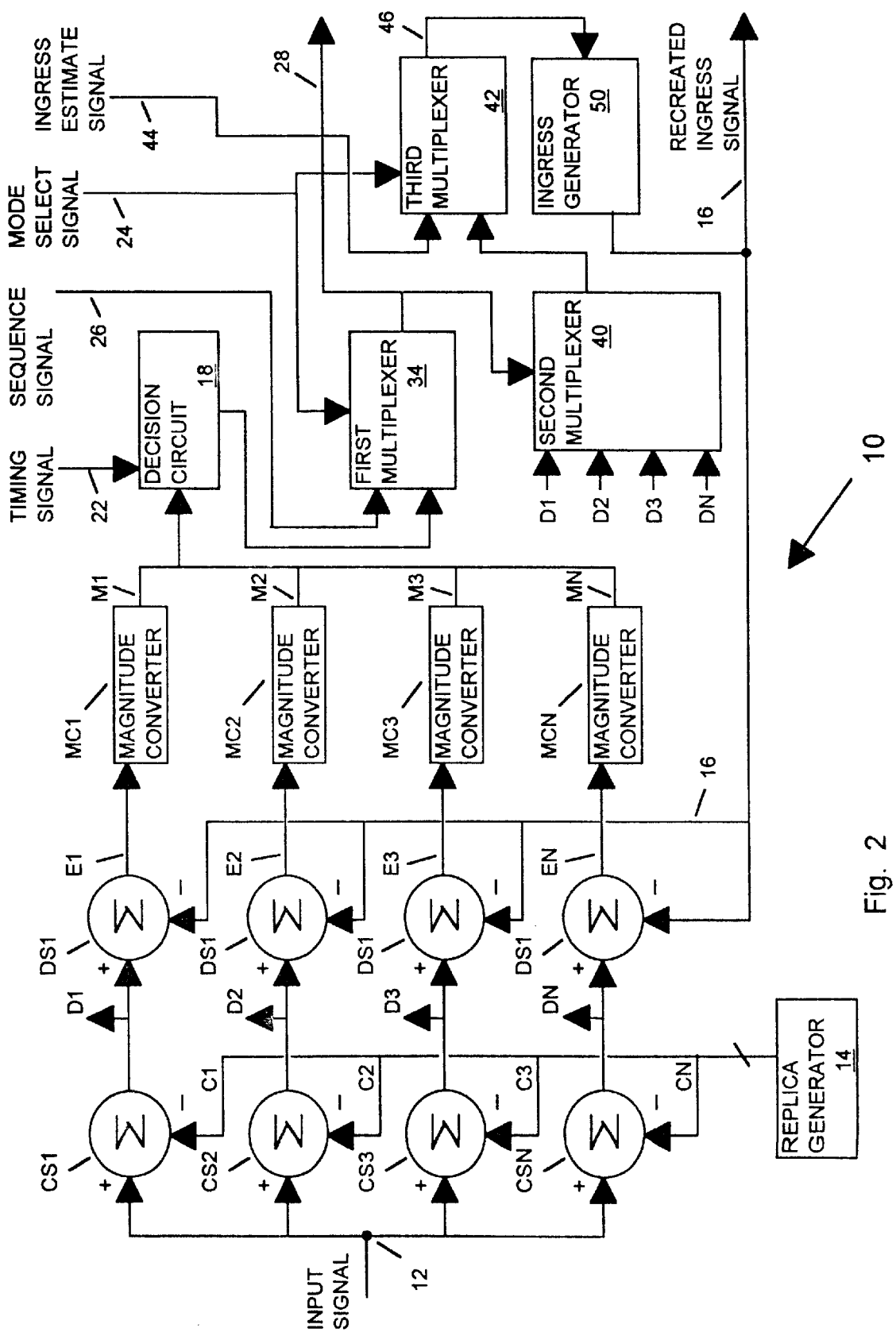
FIG. 2 is a block diagram of an ingress synthesizer of the present invention for recreating the ingress signal of FIG. 1.

FIG. 2 is a block diagram an ingress synthesizer of the present invention referred to by the general reference number 10. The ingress synthesizer 10 receives an input signal on a line 12 having desired in-phase (I) and quadrature phase modulation symbols that are modulated by an undesired ingress signal and noise as illustrated in FIG. 1 and described in the accompanying detailed description. Preferably, the input signal on the line 12 has the form of a complex signal having a multi-bit I signal representative of the in-phase (I) component of the input signal and a multi-bit Q signal representative of the quadrature phase (Q) component of the input signal. The line 12 connects the input signal to several first summers shown with reference identifications CS1, CS2, CS3, through CSN where N is the number of possible IQ symbols in the input signal. For example for a binary phase shift key (BPSK) signal, N is two; for a quadrature phase shift key (QPSK) signal, N is four; for a sixteen quadrature amplitude modulation signal, N is sixteen; for a sixty-four QAM signal, N is sixty-four; for a two-hundred fifty-six QAM signal, N is two-hundred fifty-six; and so on. The first summers CS1 to CSN are complex meaning they operate on the I component of the input signal and the Q component of the input signal. A symbol replica generator 14 generates a replica signal having complex replicas of the IQ symbols on lines C1, C2, C3, through CN, respectively, having indexes one through N that are representative of the N possible input signal symbols. The first summers CS1, CS2, CS3, through CSN provide complex intermediate signals on respective lines D1, D2, D3, through DN by subtracting the replica symbols on the respective lines C1, C2, C3, through CN from the input signal on the line 12. Second complex summers DS1, DS2, DS3, through DSN receive the intermediate signals on the lines D1, D2, D3, through DN, respectively, and subtract a complex recreated ingress signal from a line 16, the generation of which is described below, for providing complex error signals on respective lines E1, E2, E3, through EN.

Magnitude converters MC1, MC2, MC3, through MCN convert the error signals on the lines E1, E2, E3, through EN, respectively, from a complex IQ form to a magnitude form for providing respective magnitude signals on lines M1, M2, M3, through MN. The magnitude signals on the lines M1 to MN have levels that increase and decrease as the magnitudes of the error signals on the lines E1 to EN increase and decrease, respectively. In a preferred embodiment, the levels of the magnitude signals on the lines M1 to MN are proportional to the sum of the squares of the magnitudes of the in-phase (I) and the quadrature phase (Q) of the error signals on the respective lines E1 through EN. However, in alternative embodiments the levels of the magnitude signals on the lines M1 to MN are proportional to the square root of the sum of the squares, to the sum of the I level and the Q level, or to the level of the larger of the I level and the Q level of the respective error signals on the lines E1 to EN. The magnitude signals on the lines M1 to MN are passed to a decision circuit 18. The decision circuit 18 uses a symbol timing signal from a line 22 for detecting the levels of the magnitude signals on the lines M1 to MN and providing the replica index 1 to N that corresponds to the respective lines M1 to MN having the smallest magnitude for each sequential time. The timing signal on the line 22 is synchronized to the input signal symbols.

The decision circuit 18 passes a series of the replica indexes 1 to N in a signal stream to a first multiplexer 34. The first multiplexer 34 uses a mode select signal from a line 24 for selecting either the replica index stream or a known index stream in a sequence signal from a line 26 for providing an estimated index signal on a line 28. The sequence signal on the line 26 is representative of a pre-determined sequence of symbols that is expected to appear periodically in the input signal, such as a preamble, a training sequence, or a synchronization sequence. The mode select signal on the line 24 selects the sequence signal from the line 26 when the pre-determined sequence is detected as described below in the detailed description that accompanies FIG. 4 and otherwise selects the replica index stream signal as the estimated index signal provided on the line 28. Optionally, the estimated index signal on the line 28 may be used as the stream of correct input signal symbols. However, for a more robust determination of the correct input signal symbols it is preferable to use the recreated ingress signal of the line 16 for performing further processing of the input signal as described below in the detailed description that accompanies FIG. 4.

The second multiplexer 40 uses the estimated index signal on the line 28 for selecting a particular one of the intermediate signals on the lines D1 to DN that corresponds to the replica index 1 to N when the current input signal symbol sequence is not known as is the case for communication data or the known index when the current symbol sequence in the input signal is known. An optional third multiplexer 42 uses a second mode select signal on the line 24 for selecting either the particular intermediate signal or an initial complex ingress estimate signal from a line 44 for providing a complex ingress estimate signal on a line 46. The initial ingress estimate signal on the line 44 is available in a burst communication system by detecting the ingress signal during an interburst gap when the input signal as described below in the detailed description that accompanies FIG. 4. The ingress estimate signal on the line 46 is passed to an ingress generator 50. The ingress generator 50 smoothes the ingress estimate signal as described below in the detailed description that accompanies FIG. 3 for providing the recreated ingress signal on the line 16.

Figure 3:
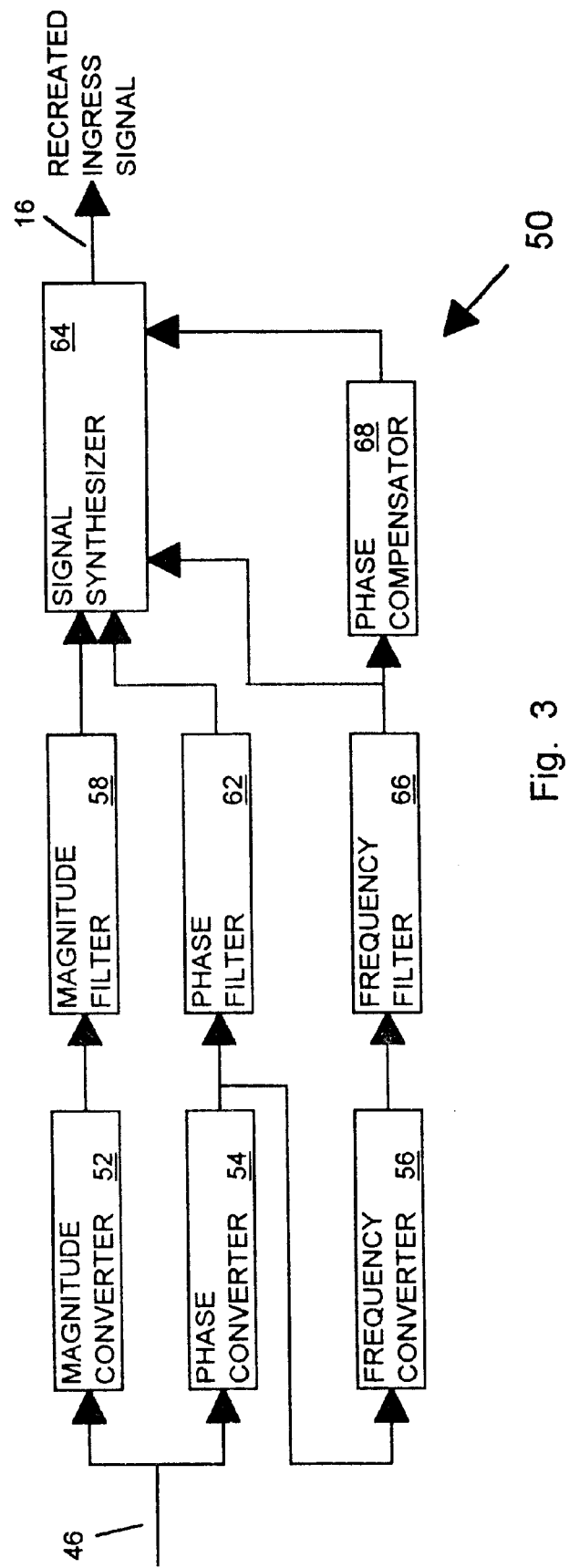
FIG. 3 is a block diagram of an ingress generator of the ingress synthesizer of FIG. 2.

FIG. 3 is a block diagram of the ingress generator 50. The ingress generator 50 includes a magnitude converter 52, a phase converter 54, and a frequency converter 56. The magnitude converter 52 and the phase converter 54 operate in parallel for converting the rectangular I and Q components of the complex ingress estimate signal on the line 46 to a polar form having a magnitude signal having a level corresponding roughly to the magnitude of the ingress estimate signal and a phase signal having a level corresponding to the phase of the ingress estimate signal, respectively. The magnitude and phase signals are filtered in a magnitude filter 58 and a phase filter 62, respectively, and passed to a signal synthesizer 64. The frequency converter 56 uses the phase signal and time for providing a frequency signal having a level corresponding to the frequency of the ingress estimate signal and provides the frequency signal to a frequency filter 66. The frequency filter 66 passes a filtered frequency signal to the signal synthesizer 64 and to a phase compensator 68. The phase compensator 68 generates a phase lead θ to compensate for the phase lag in the circuitry from the interference summers DS1–DSN (FIG. 2) through the output of the signal synthesizer 64 at the frequency indicated by the level of the filtered frequency signal. For example, when the phase lag is six symbol time periods and the frequency indicated by the filtered frequency signal is ten degrees per symbol time period, the phase lead θ is sixty degrees. Typically, the magnitude, phase, and frequency filters 58, 62, and 66 are low pass filters having pass bands that are determined independently according to the characteristics of the ingress signals that are expected. In an exemplary case, where the ingress signal is caused by a shortwave amplitude modulated (AM) radio signal, the frequency filter 66 has a lower pass band than the magnitude filter 58. The signal synthesizer 64 uses the filtered magnitude, phase, and frequency signals for synthesizing the recreated ingress signal on the line 16 according to equation 1.

$$\text{RECREATED INGRESS SIGNAL} = M * e^{j(\phi + \theta + f*t)} \quad (1)$$

In the equation 1, "M" is proportional to the level of the filtered magnitude signal, "φ" is proportional to the level of the filtered phase signal, "θ" is proportional to the level of the phase lead compensation for phase lag in the circuitry, "f" is proportional to the level of the filtered frequency signal, and "t" is time. The recreated ingress signal is then provided by the signal synthesizer 64 in a complex rectangular form having I and Q components on the line 16. In a preferred embodiment such signal synthesizer 64 is constructed in digital hardware with a sine and cosine lookup table and a scaling multiplier.

Figure 4:
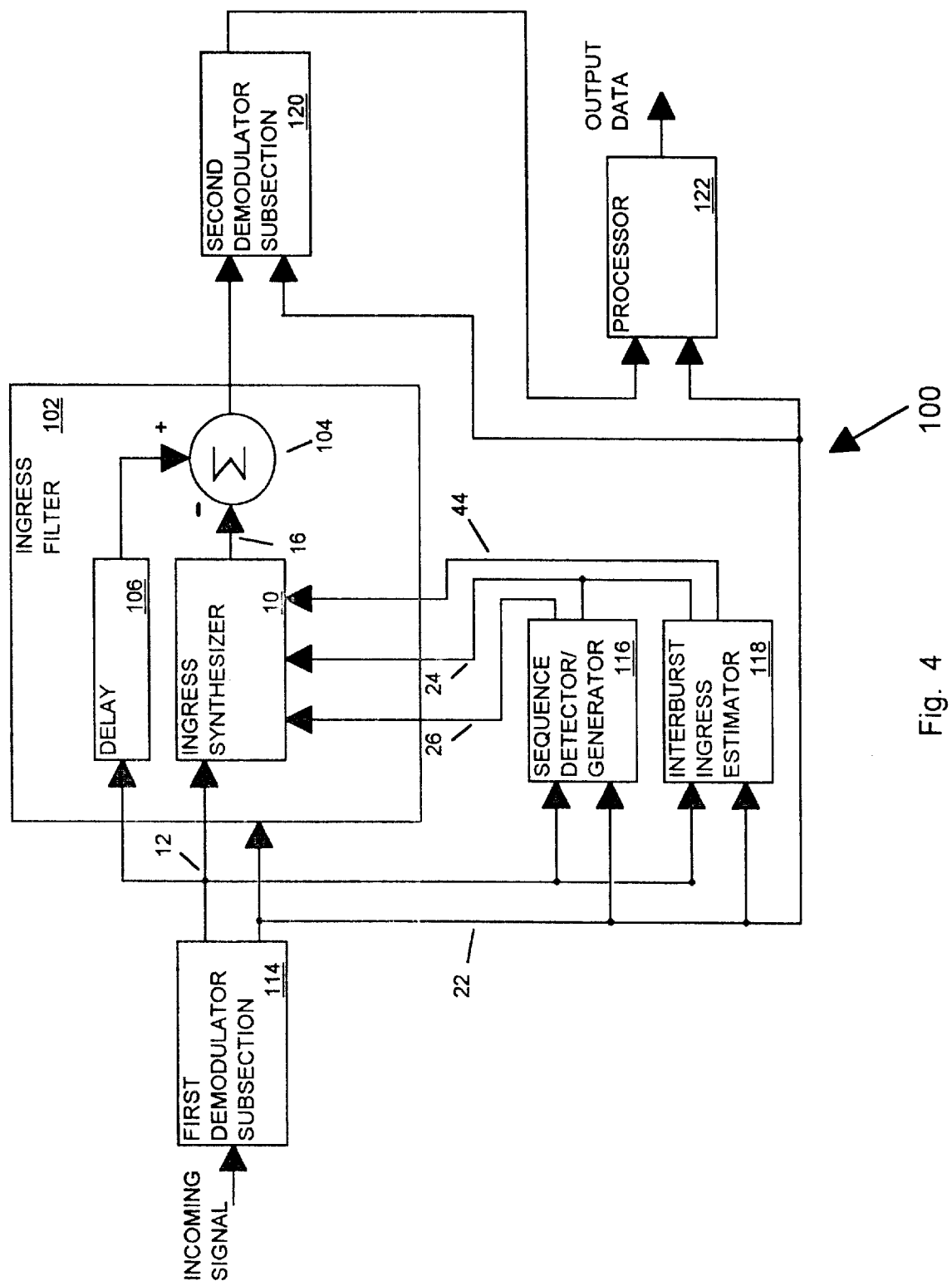
FIG. 4 is a block diagram of a receiver of the present invention including an ingress filter of the present invention using the ingress synthesizer of FIG. 2 for filtering an input signal exemplified in FIG. 1 for determining the correct modulation symbol states.

FIG. 4 is a block diagram of a receiver 100 including an ingress filter 102. The ingress filter 102 includes the ingress synthesizer 10 for recreating the undesired ingress modulation from the input signal received on the line 12, an ingress subtractor 104, and a delay circuit 106. The delay circuit 106 delays the input signal from the line 12 to equalize the time delay for the recreated ingress signal at the output of the ingress synthesizer 10 from the input signal on the line 12 and passes a delayed input signal to the ingress subtractor 104. The ingress subtractor 104 subtracts the recreated ingress signal from the delayed input signal for providing a filtered input signal where the undesired ingress signal modulation is substantially reduced in level as compared to the input signal on the line 12.

The receiver 100 further includes a first demodulator subsection 114, a sequence detector/generator 116, an interburst ingress estimator 118, a second demodulator subsection 120, and a processor 122. The first demodulator subsection 114 recovers and synchronizes to the carrier of an incoming signal having at least two possible modulation states representing symbols; recovers a symbol clock for providing the timing signal on the line 22; converts the incoming signal to representative multi-bit I and Q digital signals; Nyquist filters the digital signals; and then passes the filtered I and Q digital signals as the input signal on the line 12 to the ingress filter 102, the sequence detector/generator 116, and the interburst ingress estimator 118. The first demodulator subsection 114 typically includes a downconverter for frequency shifting the one or more frequencies of an incoming signal to a fixed frequency that is suitable for digital processing. In the input signal on the line 12, the exemplary locations 1 to 4 (FIG. 1) are fixed, or are slowly rotating about the intersection of the I axis and the Q axis (FIG. 1) with respect to the frequency of the symbol timing signal on the line 22.

The sequence detector/generator 116 receives the timing signal on the line 22 and uses well-known correlation techniques for detecting when a known symbol sequences, such as a preamble, a training signal, or a synchronization signal is arriving in the input signal on the line 12. When the known sequence arrives, the sequence detector/generator 116 issues the indexes of the sequence in the sequence signal on the line 26 and issues the mode select signal on the line 24. The sequence detector/generator 116 and the first demodulator subsection 114 may be integrated so that they work together for determining the symbol timing signal on the line 22 and the arrival of the known sequence.

When the incoming signal is a burst signal, the interburst ingress estimator 118 receives the timing signal on the line 22 and detects an interburst gap between signal bursts. Because there are no input signal symbols during the gap, a continuous ingress signal is straightforward to determine. When the interburst gap is detected, the interburst ingress estimator 118 issues the ingress estimate signal on the line 44 representative of the input signal on the line 12 during the interburst gap and issues the second mode select signal on the line 24. The interburst ingress estimator 118 may be integrated to work together with the first demodulator subsection 114 and the sequence detector/generator 116.

The ingress filter 102 issues the filtered input signal to a second demodulator subsection 120. The second demodulator subsection 120 receives the timing signal on the line 22 and the filtered input signal and equalizes the filtered input signal to correct for multipath and passes an equalized input signal to a processor 122. The processor 122 converts the symbols in the equalized input signal to raw data and converts the raw data to output communication data by performing the de-scrambling, decrypting, forward error correction, and/or de-framing that is required. In an alternative embodiment, the second demodulator subsection 120 recovers the symbol timing signal from the filtered input signal provides the timing signal on the line 22 to the ingress filter 102, first demodulator subsection 114, sequence detector/generator 116, interburst ingress estimator 118, and the processor 122.

One practical application of the present invention is in the head end of a bi-directional cable television system receiving incoming signal bursts in a five to sixty-five megahertz range. In a preferred embodiment, the ingress filter 102 and/or the receiver 100 is designed using either a gate array or standard cells using CMOS circuitry and manufactured in any one of many commercial foundries such as Lucent Technologies, Inc. of Murray Hill, N.J. or VSLI Technology, Inc. of San Jose, Calif.

The term ingress typically refers to a cabled system where an undesired signal gets into the cable that is carrying the desired signal. However, the present invention is applicable to wireless systems as well for filtering undesired interference signals.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver for receiving an input signal having at least two possible input signal symbols having undesired ingress modulation due to an ingress signal, comprising:

a replica generator for generating fixed replica corresponding respectively to said input signal symbols; each of said replicas symbols corresponding, respectively, to a particular one of said input signal symbols and each of said replica symbols different from each other of said replica symbols;

at least two first summers, each said first summer for subtracting a respective one of said replicas symbols from said input signal for providing respective intermediate signals; and a decision circuit for selecting a particular one of said intermediate signals for a recreated ingress signal representative of said ingress signal.

2. The receiver of claim 1, further including:

an ingress subtractor for subtracting said recreated ingress signal from said input signal for providing a filtered input signal having filtered symbols having a reduced level of said undesired ingress modulation as compared to said input signal symbols.

3. The receiver of claim 1, further including:

at least two second summers, each said second summer for subtracting said recreated ingress signal from said intermediate signals for providing respective error signals; and wherein:

the decision circuit is further for selecting said particular intermediate signal based upon said error signals.

4. The receiver of claim 3, wherein:

the decision circuit is further for selecting said particular intermediate signal corresponding to a particular one of said error signals having a smallest magnitude.

5. The receiver of claim 1, further including:

a converter for converting said particular intermediate signal into a magnitude signal having a level corresponding to a magnitude of said particular intermediate signal, a phase signal having a level corresponding to a phase of said particular intermediate signal, and a frequency signal having a level corresponding to a frequency of said particular intermediate signal; and a synthesizer for synthesizing said recreated ingress signal from said magnitude signal, said phase signal, and said frequency signal.

6. The receiver of claim 5, wherein:

the converter includes at least one of a (i) magnitude filter for filtering said magnitude signal, (ii) a phase filter for filtering said phase signal, and (iii) frequency filter for filtering said frequency signal for use in synthesizing said recreated ingress signal.

7. The receiver of claim 1, wherein:

the decision circuit is further for identifying a correct one of said input signal symbols according to a particular one of said replica symbols that is providing said particular intermediate signal.

8. The receiver of claim 1, wherein:

said input signal includes signal bursts and interburst gaps; and further including:

an interburst ingress estimator for determining an ingress estimate signal during said interburst gaps; and a multiplexer for substituting said ingress estimate signal for said particular intermediate signal during said interburst gaps.

9. The receiver of claim 1, wherein:

said input signal includes a known sequence of said input signal symbols followed by an unknown sequence of said input signal symbols; and further including:

a sequence detector/generator for detecting and providing said known sequence when said known sequence is arriving in said input signal; and a multiplexer using said known sequence for selecting said particular intermediate signal.

10. A method for receiving an input signal having at least two possible input signal symbols having undesired ingress modulation due to an ingress signal, comprising steps of:

providing fixed replica symbols, each of said replica symbols corresponding, respectively, to a particular one of said input signal symbols and each of said replica symbols different from each other of said replica symbols;

subtracting said replica symbols from said input signal for providing respective intermediate signals; and selecting a particular one of said intermediate signals as a recreated ingress signal representative of said ingress signal.

11. The method of claim 10, further including a step of:

subtracting said recreated ingress signal from said input signal for providing a filtered input signal having filtered symbols having a reduced level of said undesired ingress modulation as compared to said input signal symbols.

12. The method of claim 10, wherein:

the step of selecting said particular intermediate signal includes steps of: subtracting said recreated ingress signal from said intermediate signals for providing respective error signals; and selecting said particular intermediate signal based upon said error signals.

13. The method of claim 12, wherein:

said step of selecting said particular intermediate signal includes a step of selecting said particular intermediate signal corresponding to a particular one of said error signals having a smallest magnitude.

14. The method of claim 10, wherein:

the step of selecting said particular intermediate signal includes steps of: converting said particular intermediate signal into a magnitude signal having a level corresponding to a magnitude of said particular intermediate signal, a phase signal having a level corresponding to a phase of said particular intermediate signal, and a frequency signal having a level corresponding to a frequency of said particular intermediate signal; and synthesizing said recreated ingress signal from said magnitude signal, said phase signal, and said frequency signal.

15. The method of claim 14, wherein:

the step of converting includes filtering at least one of said magnitude signal, said phase signal, and said frequency signal.

16. The method of claim 12, further including a step of:

identifying a correct one of said input signal symbols according to a particular one of said replica symbols that corresponds to said particular intermediate signal.

17. The method of claim 10, wherein:

said input signal includes signal bursts and interburst gaps; and further including steps of:

determining an ingress estimate signal from said input signal during said interburst gaps; and using said ingress estimate signal for said recreated ingress signal during said interburst gaps.

18. The method of claim 10, wherein:

said input signal includes a known sequence of said input signal symbols followed by an unknown sequence of said input signal symbols; and further including steps of:

detecting when said known sequence is arriving in said input signal; and using said known sequence for selecting said particular intermediate signal.

* * * * *

UNITED STATES PATENT AND TRADEMARK OFFICE
CERTIFICATE OF CORRECTION

PATENT NO.    : 6,229,857 B1                                          Page 1 of 1
DATED         : May 8, 2001
INVENTOR(S)   : Andy Wagner et al.

It is certified that error appears in the above-identified patent and that said Letters Patent is hereby corrected as shown below:

<u>Column 6,</u>
Lines 62-63, delete "corresponding respectively to said input signal".
Line 54, delete "replicas" and insert -- replica --.

<u>Column 7,</u>
Line 2, delete "replicas" and insert -- replica --.

Signed and Sealed this

First Day of April, 2003

JAMES E. ROGAN
*Director of the United States Patent and Trademark Office*